United States Patent
Feeney et al.

(10) Patent No.: US 7,837,888 B2
(45) Date of Patent: Nov. 23, 2010

(54) COMPOSITION AND METHOD FOR DAMASCENE CMP

(75) Inventors: Paul M. Feeney, Aurora, IL (US); Sriram Anjur, Aurora, IL (US); Jeffrey M. Dysard, St. Charles, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 1045 days.

(21) Appl. No.: 11/599,199

(22) Filed: Nov. 13, 2006

(65) Prior Publication Data

US 2008/0113589 A1    May 15, 2008

(51) Int. Cl.
*B24B 29/02* (2006.01)
*B24B 7/00* (2006.01)
*C09K 3/14* (2006.01)

(52) U.S. Cl. .............................. 216/53; 451/37; 51/307
(58) Field of Classification Search ....................... None
See application file for complete search history.

(56) References Cited

U.S. PATENT DOCUMENTS

| | | | |
|---|---|---|---|
| 5,196,353 A | 3/1993 | Sandhu et al. | |
| 5,433,651 A | 7/1995 | Lustig et al. | |
| 5,609,511 A | 3/1997 | Moriyama et al. | |
| 5,643,046 A | 7/1997 | Katakabe et al. | |
| 5,658,183 A | 8/1997 | Sandhu et al. | |
| 5,730,642 A | 3/1998 | Sandhu et al. | |
| 5,838,447 A | 11/1998 | Hiyama et al. | |
| 5,872,633 A | 2/1999 | Holzapfel et al. | |
| 5,893,796 A | 4/1999 | Birang et al. | |
| 5,949,927 A | 9/1999 | Tang | |
| 5,964,643 A | 10/1999 | Birang et al. | |
| 6,227,949 B1 | 5/2001 | Yi et al. | |
| 6,291,349 B1 * | 9/2001 | Molnar | 438/690 |
| 6,293,848 B1 | 9/2001 | Fang et al. | |
| 6,334,880 B1 | 1/2002 | Negrych et al. | |
| 6,346,202 B1 * | 2/2002 | Molnar | 216/88 |
| 6,350,678 B1 | 2/2002 | Pramanick et al. | |
| 6,354,916 B1 * | 3/2002 | Uzoh et al. | 451/41 |
| 6,358,853 B2 | 3/2002 | Cadien et al. | |
| 6,365,520 B1 * | 4/2002 | Rhoades et al. | 438/690 |
| 6,375,694 B1 | 4/2002 | Roberts et al. | |
| 6,402,884 B1 | 6/2002 | Robinson et al. | |
| 6,409,781 B1 | 6/2002 | Wojtczak et al. | |
| 6,596,042 B1 | 7/2003 | Feng et al. | |
| 6,599,174 B1 | 7/2003 | Spikes, Jr. | |
| 6,612,917 B2 | 9/2003 | Bruxvoort | |
| 6,620,215 B2 | 9/2003 | Li et al. | |
| 6,638,328 B1 | 10/2003 | Lee et al. | |

(Continued)

FOREIGN PATENT DOCUMENTS

EP    1 190 006 B1    3/2002

*Primary Examiner*—Allan Olsen
(74) *Attorney, Agent, or Firm*—Thomas E. Omholt; Francis J. Koszyk; Steven D. Weseman

(57) ABSTRACT

The invention provides a method of chemically-mechanically polishing a substrate having at least one feature defined thereon, wherein the feature has at least one dimension with a size W, with a chemical-mechanical polishing composition. The polishing composition comprises particles of an abrasive wherein the particles have a mean particle diameter $D_M$ wherein the mean particle diameter of the particles satisfies the equation: $D_M > W$. The invention further provides a method of preparing the chemical-mechanical polishing composition.

22 Claims, 2 Drawing Sheets

U.S. PATENT DOCUMENTS

| | | |
|---|---|---|
| 6,676,492 B2 * | 1/2004 | Li .................. 451/65 |
| 6,723,144 B2 * | 4/2004 | Katagiri et al. ............... 51/308 |
| 6,753,250 B1 | 6/2004 | Hill et al. |
| 6,939,211 B2 | 9/2005 | Taylor et al. |
| 6,976,904 B2 * | 12/2005 | Li et al. .................. 451/28 |
| 7,060,621 B2 | 6/2006 | Minamihaba et al. |
| 7,419,911 B2 * | 9/2008 | Chelle et al. ............... 438/692 |
| 7,569,613 B2 * | 8/2009 | Chane-Ching ............... 516/89 |
| 2002/0004317 A1 | 1/2002 | Cadien et al. |
| 2002/0017063 A1 | 2/2002 | Beitel et al. |
| 2002/0061715 A1 * | 5/2002 | Uzoh et al. .................. 451/41 |
| 2002/0173252 A1 * | 11/2002 | Li .................. 451/259 |
| 2003/0047710 A1 | 3/2003 | Babu et al. |
| 2003/0077995 A1 * | 4/2003 | Li et al. .................. 451/528 |
| 2003/0211815 A1 | 11/2003 | Carter et al. |
| 2004/0126966 A1 * | 7/2004 | Cheong et al. ............... 438/257 |
| 2004/0203241 A1 | 10/2004 | Hampden-Smith et al. |
| 2004/0226918 A1 | 11/2004 | Lee et al. |
| 2004/0259366 A1 * | 12/2004 | Kim et al. .................. 438/691 |
| 2004/0261323 A1 | 12/2004 | Minamihaba et al. |
| 2005/0178742 A1 * | 8/2005 | Chelle et al. ............... 216/88 |
| 2005/0275617 A1 * | 12/2005 | Murooka .................. 345/107 |
| 2006/0032150 A1 * | 2/2006 | So et al. .................. 51/309 |
| 2006/0037251 A1 | 2/2006 | Kurata et al. |
| 2006/0169597 A1 * | 8/2006 | Liu et al. .................. 205/680 |
| 2006/0175295 A1 * | 8/2006 | Chu et al. .................. 216/88 |
| 2006/0246723 A1 * | 11/2006 | Park et al. .................. 438/692 |
| 2006/0261306 A1 * | 11/2006 | Li et al. .................. 252/79.1 |
| 2006/0270235 A1 * | 11/2006 | Siddiqui et al. ............. 438/692 |
| 2006/0283093 A1 * | 12/2006 | Petrovic et al. ............... 51/307 |
| 2007/0034116 A1 * | 2/2007 | Mac Donald ............ 106/38.27 |
| 2007/0075291 A1 * | 4/2007 | Paik et al. .................. 252/79.1 |
| 2007/0084134 A1 * | 4/2007 | Wang et al. .................. 51/309 |
| 2007/0092423 A1 * | 4/2007 | Hyeon et al. ............... 423/263 |
| 2007/0179203 A1 * | 8/2007 | Chane-Ching ............... 516/78 |
| 2007/0208123 A1 * | 9/2007 | Kambe et al. ............... 524/432 |
| 2007/0285973 A1 * | 12/2007 | Murooka .................. 365/151 |
| 2007/0293589 A1 * | 12/2007 | Kerns .................. 516/78 |
| 2008/0105980 A1 * | 5/2008 | Kim .................. 257/758 |
| 2008/0113589 A1 * | 5/2008 | Feeney et al. .................. 451/37 |
| 2008/0188032 A1 * | 8/2008 | Rantala .................. 438/82 |
| 2008/0188079 A1 * | 8/2008 | Kato et al. .................. 438/693 |
| 2008/0199392 A1 * | 8/2008 | Schumacher et al. ...... 423/593.1 |
| 2009/0053976 A1 * | 2/2009 | Roy et al. .................. 451/36 |
| 2009/0133336 A1 * | 5/2009 | Kim et al. .................. 51/298 |

* cited by examiner

COMPOSITION AND METHOD FOR DAMASCENE CMP

FIELD OF THE INVENTION

The invention pertains to chemical-mechanical polishing compositions and methods.

BACKGROUND OF THE INVENTION

Integrated circuits are made up of millions of active devices formed in or on a substrate, such as a silicon wafer. The active devices are chemically and physically connected into a substrate and are interconnected through the use of multilevel interconnects to form functional circuits. Typical multilevel interconnects comprise a first metal layer, an interlevel dielectric layer, and sometimes a third and subsequent metal layers. Interlevel dielectrics, such as doped and undoped silicon dioxide ($SiO_2$) and/or low-κ dielectrics, are used to electrically isolate the different metal layers. As each layer is formed, typically the layer is planarized to enable subsequent layers to be formed on top of the newly formed layer.

Metals such as tungsten and copper are increasingly being used as conductive materials to form the interconnections in integrated circuit devices. One way to fabricate planar metal circuit traces on a silicon dioxide substrate is referred to as the damascene process. In accordance with this process, the silicon dioxide dielectric surface is patterned by a conventional dry etch process to form holes and trenches for vertical and horizontal interconnects. The horizontal interconnects define the circuit patterns on each level of the device and are interconnected by way of vertical interconnects, known as vias. The patterned surface is coated with an adhesion-promoting layer such as titanium or tantalum and/or a diffusion barrier layer such as titanium nitride or tantalum nitride. The adhesion-promoting layer and/or the diffusion barrier layer are then over-coated with a tungsten or copper layer. Chemical-mechanical polishing is employed to reduce the thickness of the tungsten or copper over-layer, as well as the thickness of any adhesion-promoting layer and/or diffusion barrier layer, until a planar surface that exposes elevated portions of the silicon dioxide surface is obtained. The vias and trenches remain filled with electrically conductive tungsten or copper forming the circuit interconnects.

Another use of the damascene process is in the formation of chip interconnects using polysilicon plugs. To form polysilicon plugs, a hole is etched into an insulating layer, such as silicon dioxide. Next, polysilicon is deposited into the hole. The polysilicon on the surface of the oxide is then planarized using chemical-mechanical polishing or reactive-ion etching. A metal line subsequently may be used to interconnect selected polysilicon plugs by a damascene process as described herein.

Compositions and methods for planarizing or polishing the surface of a substrate, especially for chemical-mechanical polishing (CMP), are well known in the art. Polishing compositions (also known as polishing slurries) typically contain an abrasive material in an aqueous solution and are applied to a surface by contacting the surface with a polishing pad saturated with the polishing composition. The polishing compositions typically comprise chemical reagents that react with the surface of a substrate being polished in order to convert the surface into a softer, more readily abradable form. The abrasive material in conjunction with the polishing pad (e.g., polishing cloth or disk) removes material from the substrate surface via mechanical action.

One of the challenges in development of improved CMP processes is control of dishing, also known as recessing. Dishing refers to the deviation from planarity of material resident in the individual device features (e.g., lines or vias). In order to ensure adequate planarization of a substrate surface and to ensure complete removal of metal or polysilicon present outside of the device features, a certain amount of polishing beyond that necessary to achieve coplanarity of the device feature with the substrate surface, i.e., overpolishing, is typically necessary. Metal or polysilicon residing within device features is subject to attack by chemical components of the polishing composition as well as to mechanical abrasion by abrasive particles in the polishing composition. The chemistry of polishing compositions often can be tailored to minimize chemical attack on materials residing in device features. However, the abrasive particles commonly used in CMP compositions typically have particle sizes that are smaller than the feature dimensions, and thus materials residing in device features are accessible to the abrasive particles and are thus subject to mechanical abrasion during overpolishing, with resulting dishing of the device features.

Attempts have been made to control dishing through incorporation of various surface-active agents into polishing compositions that interact with the surface of materials residing in device features and provide a steric barrier to the approach of abrasive particles. However, the surface-active agents also reduce the removal rate of metals or polysilicon residing outside of the device features. Mechanical approaches to control dishing include reduction of downforce pressure of the substrate to be polished against the polishing pad during overpolishing. However, reducing the downforce increases the amount of time required for adequate polishing, which reduces device throughput and increases overall cost. Thus, there remains a need in the art for improved polishing compositions and methods for the chemical-mechanical planarization of substrates having device features thereon, such as lines, vias, and plugs.

The invention provides such a polishing composition and method.

BRIEF SUMMARY OF THE INVENTION

The invention provides a method of chemically-mechanically polishing a substrate, which method comprises (i) providing a substrate having at least one feature defined thereon, wherein the feature has at least one dimension with a size W and wherein the at least one dimension is substantially coplanar with the substrate surface, (ii) contacting the substrate with a polishing pad and a chemical-mechanical polishing composition comprising particles of an abrasive wherein the particles have a mean particle diameter $D_M$ wherein the mean particle diameter of the particles satisfies the equation: $D_M > W$, (iii) moving the polishing pad relative to the substrate with the chemical-mechanical polishing composition therebetween, and (iv) abrading at least a portion of the substrate to polish the substrate. The invention also provides a method of preparing a chemical-mechanical polishing composition, which method comprises (i) selecting a substrate to be polished with a chemical-mechanical polishing composition, wherein the substrate has at least one feature defined thereon, wherein the feature has at least one dimension with a size W, and wherein the at least one dimension is substantially coplanar with the substrate surface, (ii) providing an abrasive wherein the abrasive comprises particles having a mean particle diameter $D_M$ wherein the mean particle diameter of the particles satisfies the equation: $D_M>W$, and (iii) formulating the abrasive into a chemical-mechanical polishing composition.

BRIEF DESCRIPTION OF THE SEVERAL VIEWS OF THE DRAWING(S)

DETAILED DESCRIPTION OF THE INVENTION

Figure 1:
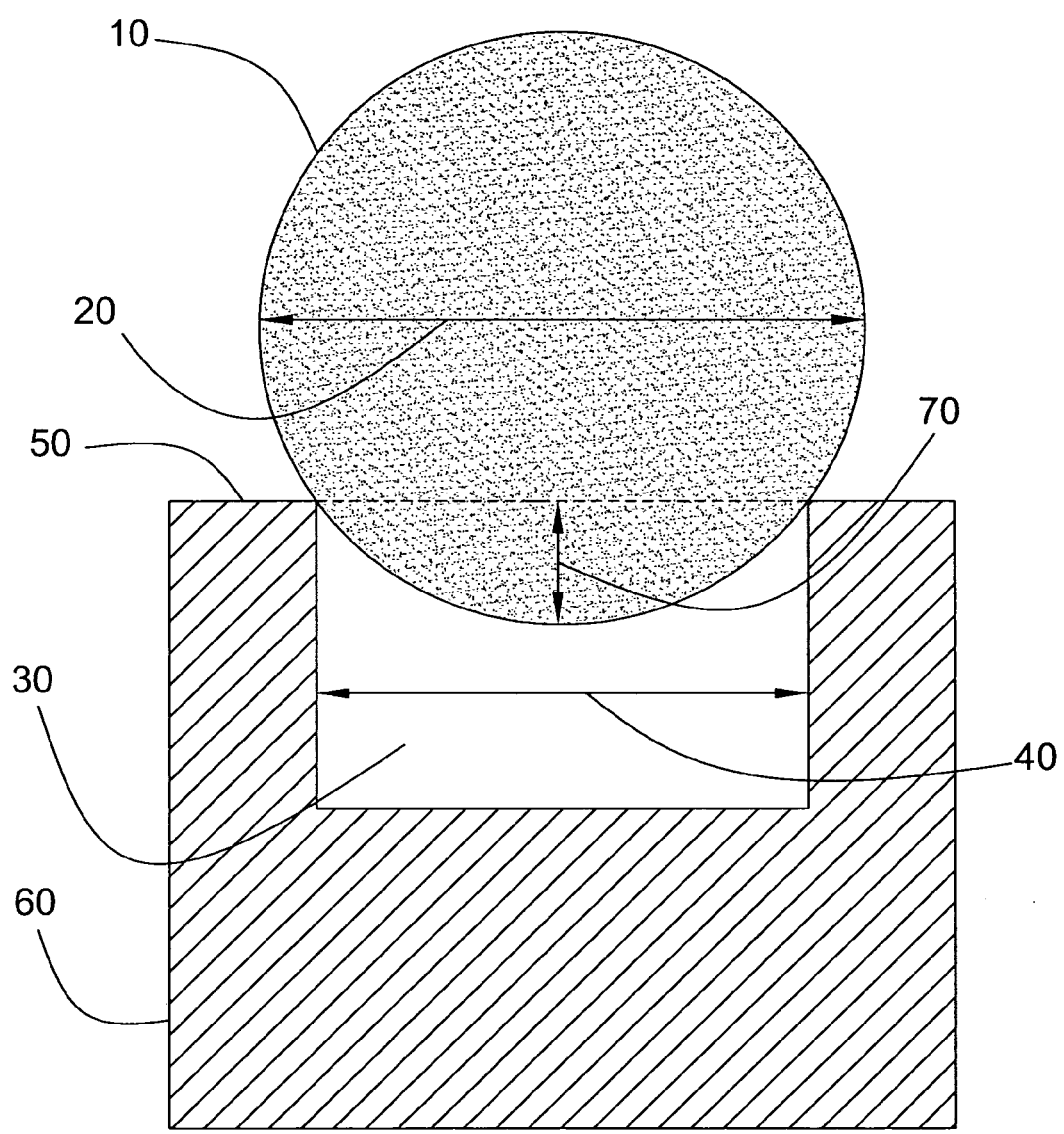
FIG. 1 is a partial side view of a substrate feature in relation to an abrasive particle in accordance with the invention.

The invention provides a method of chemically-mechanically polishing a substrate. The method involves (i) providing a substrate having at least one feature defined thereon, (ii) contacting the substrate with a polishing pad and a chemical-mechanical polishing composition comprising particles of an abrasive, (iii) moving the polishing pad relative to the substrate with the chemical-mechanical polishing composition therebetween, and (iv) abrading at least a portion of the substrate to polish the substrate. The feature of the substrate has at least one dimension with a size W wherein the at least one dimension is substantially coplanar with the substrate surface. The particles of the abrasive have a mean particle diameter $D_M$ which satisfies the equation: $D_M>W$.

The substrate can be any suitable substrate. Generally, the substrate is a semiconductor wafer used in the semiconductor industry. Typically, the substrate will have at least one feature defined thereon. The at least one feature can be any feature introduced onto the surface of semiconductor wafers to define a circuit element. Examples of features include lines, plugs, and vias. The at least one feature contains a material that is different from the material comprising the substrate and comprises, for example, metal or polysilicon. Non-limiting examples of suitable metals include tungsten and copper. Optionally, the at least one feature additionally comprises a barrier and/or adhesion-promoting layer. The at least one feature has at least one dimension substantially coplanar with the substrate surface with a size W, wherein the feature is a recessed region of the substrate. When the at least one feature is a circuit line with a length L, the at least one dimension is the width W of the circuit line, wherein $W \leq L$. When the at least one feature is a square, the width is equal to the length, or $W=L$. When the at least one feature is a plug or a via, the at least one dimension is the diameter of a circle that encompasses a cross section of the plug or via.

The chemical-mechanical polishing composition comprises particles of an abrasive wherein the particles have a mean particle diameter $D_M$ wherein the mean particle diameter of the particles satisfies the equation: $D_M>W$ (e.g., wherein $D_M>1.1 W$, or wherein $D_M>1.2W$, or wherein $D_M>1.25W$). In this regard, particle diameter refers to the diameter of the smallest sphere that encloses the particle.

The abrasive particles desirably have a particle size distribution wherein less than about 5% (e.g., less than about 4%, or less than about 3%, or less than about 2%, or less than about 1%) of the particles by number have a particle diameter D wherein $D<W$. The presence of a small amount of abrasive particles as recited herein having a particle diameter wherein $D<W$ advantageously provides a cleaning action for residue on the substrate without materially affecting undue erosion of the substrate. In addition, if a small amount of recess in the at least one feature is desired, the incorporation of a small amount of abrasive particles as recited herein having a particle diameter wherein $D<W$ advantageously provides for the production of a small and controlled amount of recess therein.

The particle size distribution, and thus the median particle size and percentage of particles above or below any given size, can be determined by any suitable technique. As used herein, particle diameter and particle size are synonymous. A particularly suitable method for the determination of particle size distribution for nanoparticles (e.g., particles having a particle diameter ranging from about 1 nm to about 5000 nm) is dynamic light scattering, also known as photon correlation spectroscopy. Several particle sizing instruments utilizing dynamic light scattering as the analytical method are commercially available from suppliers such as Malvern Instruments (Malvern, UK), Particle Sizing Systems (Santa Barbara, Calif.), and Micromeritics Instrument Corporation (Norcross, Ga.). In addition, the particle size distribution can be determined by using scanning electron microscopy (SEM) or transmission electron microscopy (TEM) in conjunction with commercially available image software such as Optimas 6.1 (Media Cybernetics, Inc., Silver Spring, Md.).

The abrasive can be any suitable abrasive, many of which are well known in the art. For example, the abrasive can be natural or synthetic, and can comprise certain hard polymers (e.g., polycarbonates), diamond (e.g., polycrystalline diamond), garnet, glass, carborundum, metal oxide, carbide, nitride, and the like. The abrasive preferably comprises a metal oxide, metal nitride, metal carbide, or an organic polymer. Suitable abrasives include abrasives selected from the group consisting of alumina, silica, ceria, germania, titania, zirconia, magnesia, silicon nitride, silicon carbide, organic polymers, and combinations thereof. The silica can be fumed silica or precipitated silica. Precipitated silica includes silica prepared by sol-gel processes (e.g., condensation-polymerization) and hydrothermal processes.

The abrasive can be prepared using any suitable technique. Control of the particle size and the particle size distribution in the preparation of metal oxide abrasive particles is possible in pyrogenic processes and precipitation processes including sol-gel and hydrothermal processes. For example, U.S. Pat. No. 6,596,042 discloses cerium oxide abrasive particles prepared by a hydrothermal process having substantially no particles with a size less than about 50 nm.

Alternatively, or in addition, the lower end of the particle size distribution of the abrasive particles can be controlled by sieving, filtration, or settling processes. Sieves or filters can be used to retain abrasive particles above a certain minimum particle size while allowing particles below the minimum size to pass through and thus to be removed from the retained abrasive particles. Settling processes generally involve dispersing particles in a liquid medium, allowing the larger particles to partially settle from the liquid medium, then removing the smaller particles remaining in suspension by decantation of the supernatant liquid medium from the settled particles, which are enriched in larger particles.

Any suitable amount of the abrasive can be present in the polishing composition. Typically, about 0.01 wt. % or more (e.g., about 0.05 wt. % or more, or about 0.1 wt. % or more) abrasive can be present in the polishing composition. The amount of abrasive in the polishing composition preferably will not exceed about 30 wt. %, and more preferably will not exceed about 10 wt. % (e.g., will not exceed about 8 wt. %, or will not exceed about 6 wt. %). Even more preferably the abrasive will comprise about 0.1 wt. % to about 10 wt. % (e.g., about 0.5 wt. % to about 8 wt. %) of the polishing composition.

The abrasive desirably is suspended in the polishing composition, more specifically in the liquid carrier of the polishing composition. When the abrasive is suspended in the polishing composition, the silica preferably is colloidally stable. The term colloid refers to the suspension of abrasive particles in the liquid carrier. Colloidal stability refers to the maintenance of that suspension over time. In the context of this invention, a abrasive is considered colloidally stable if, when a suspension of the abrasive in the liquid carrier is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \leqq 0.5$). The value of [B]–[T]/[C] desirably is less than or equal to 0.3, and preferably is less than or equal to 0.1.

The abrasive can comprise particles having any suitable particle morphology. The particles can have a spherical morphology, ellipsoid morphology, or a nodular morphology wherein two spherical masses have coalesced to define a nodular morphology. In a preferred embodiment, the abrasive comprises substantially spherical particles. For example, condensation-polymerized silica abrasive particles can be substantially spherical, depending on the conditions used to prepare the condensation-polymerized silica particles.

In another embodiment, the abrasive comprises particles wherein the particles have a plurality of facets. For example, many abrasive particles, such as alumina (e.g., seeded jell alumina), ceria, silicon carbide, and silicon nitride, are highly crystalline and have a particle morphology wherein the surface of the particles comprises facets which comprise crystal faces. In this embodiment, the facets will have at least one dimension across the surface of the facets that is a minimum dimension. For example, if the facets have a symmetrical pentagonal shape, the minimum dimension will be the length of the external linear segments defining the pentagon. When the particles have a plurality of facets, the facets desirably have a minimum dimension $D_{min}$ wherein $D_{min} \geqq W$.

The figure shows a representation of an abrasive particle (10) having a particle diameter D (20) in relation to a substrate feature (30) having a dimension W (40) wherein D>W. Because the surface of the abrasive particle (10) is non-planar, when the abrasive particle (10) is in contact with the surface (50) of the substrate (60) over the substrate feature (30), the abrasive particle can remove a material in the substrate feature (30) by mechanical action limited to a depth (70). The inventive method thus is self-stopping at a limited depth below the feature surface after removal of an overlying layer as a function of the particle diameter and the feature dimension. By way of contrast, when there are a significant amount of abrasive particles having D<W, there is no limit to the depth to which the abrasive particle (10) can remove material from within the substrate feature by mechanical action. Advantageously, the inventive method results in reduced recess (i.e., undesirable erosion) of substrate features during chemical-mechanical polishing. In addition, the self-stopping behavior of the inventive method allows for adjustment of the polishing composition and the polishing parameters to achieve rapid removal of an overlying layer without concomitant increase in undesirable loss due to mechanical abrasion of material within substrate features.

The polishing composition optionally comprises an oxidizing agent that oxidizes at least a part of a substrate, typically the material of the feature. Any suitable oxidizing agent can be used in conjunction with the invention. Suitable oxidizing agents include inorganic and organic per-compounds, bromates, nitrates, chlorates, chromates, iodates, iron and copper salts (e.g., nitrates, sulfates, EDTA salts, and citrates), rare earth and transition metal oxides (e.g., osmium tetraoxide), potassium ferricyanide, potassium dichromate, iodic acid, quinones, and the like. A per-compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates ($SO_5^{2-}$), dipersulfates ($S_2O_8^{2-}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. Preferably, the oxidizing agent is selected from the group consisting of hydrogen peroxide, iodates, permanganates, persulfates, hydrogen peroxymonosulfate sulfates, molybdates, ferric nitrate, nitrates, quinones, and combinations thereof. More preferably, the oxidizing agent is potassium iodate or hydrogen peroxide.

The oxidizing agent can be present in the polishing composition in any suitable amount. When present in the polishing composition, the concentration of oxidizing agent in the polishing composition desirably is about 1 mM or more (e.g., about 2 mM or more, or about 3 mM or more, or about 5 mM or more). The concentration of oxidizing agent in the polishing composition preferably is about 1 M or less (e.g., about 0.5 M or less, or about 0.25 M or less, or about 0.1 M or less). The desired concentration of oxidizing agent can be achieved by any suitable means, such as by using about 0.05 wt. % to about 20 wt. % of the oxidizing agent based on the weight of the liquid carrier and any components dissolved or suspended therein in the preparation of the polishing composition.

The polishing composition optionally comprises a film-forming agent (i.e., a corrosion inhibitor). The film-forming agent can be any suitable film-forming agent for any component(s) of the substrate. Preferably, the film-forming agent is a copper-corrosion inhibitor or a tungsten-corrosion inhibitor. For the purposes of this invention, a film-forming agent is any compound, or mixture of compounds, that facilitates the formation of a passivation layer (i.e., a dissolution-inhibiting layer) on at least a portion of the surface being polished. Useful film-forming agents include, for example, nitrogen-containing heterocyclic compounds. The film-forming agent desirably comprises one or more 5- or 6-membered, heterocyclic, nitrogen-containing rings. Preferred film-forming agent include 1,2,3-triazole, 1,2,4-triazole, benzotriazole, benzimidazole, benzothiazole, and derivatives thereof, such as, for example, hydroxy-, amino-, imino-, carboxy-, mercapto-, nitro-, urea-, thiourea-, or alkyl-substituted derivatives thereof. Most preferably, the film-forming agent is selected from the group consisting of benzotriazole, 1,2,4-triazole, and mixtures thereof. The polishing composition of the invention can comprise any suitable amount of the film-forming agent. When present in the polishing composition, the polishing composition generally comprises about 0.005 wt. % to about 1 wt. % (e.g., about 0.01 to about 0.5 wt. %, or about 0.02 to about 0.2 wt. %) of the corrosion inhibitor.

The polishing composition optionally further comprises one or more other additives. Such additives include any suitable surfactant and/or rheological control agent. Suitable surfactants include, for example, cationic surfactants, anionic surfactants, anionic polyelectrolytes, nonionic surfactants, amphoteric surfactants, fluorinated surfactants, mixtures thereof, and the like.

The polishing composition optionally further comprises an antifoaming agent. The anti-foaming agent can be any suitable anti-foaming agent. Suitable antifoaming agents include, but are not limited to, silicon-based and acetylenic diol-based antifoaming agents. The amount of anti-foaming agent present in the polishing composition of the polishing system typically is about 40 ppm to about 140 ppm.

The polishing composition optionally further comprises a biocide. The biocide can be any suitable biocide, for example an isothiazolinone biocide. The amount of biocide used in the polishing composition typically is about 1 ppm to about 500 ppm, and preferably is about 10 ppm to about 200 ppm.

A liquid carrier is used to facilitate the application of the components of the polishing composition to the surface of a suitable substrate to be polished. The liquid carrier can be any suitable liquid carrier. Typically, the liquid carrier is water, a mixture of water and a suitable water-miscible solvent, or an emulsion. Preferably, the liquid carrier comprises, consists essentially of, or consists of water, more preferably deionized water.

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., abrasive, optional oxidizing agent, etc.) as well as any combination of ingredients (e.g., abrasive, optional oxidizing agent, optional film-forming agent, etc.).

In accordance with the invention, the substrate can be polished with a polishing pad and the polishing composition described herein by any suitable technique. The method of the invention is particularly well-suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad, and by the polishing pad moving relative to the substrate, with the polishing composition therebetween, so as to abrade and remove a portion of the substrate so as to polish at least a portion of the substrate.

The polishing method can utilize any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the substrate are known in the art. Desirably, the inspection or monitoring of the progress of the polishing process with respect to a substrate being polished enables the determination of the polishing end-point, i.e., the determination of when to terminate the polishing process with respect to a particular substrate. Such methods are described, for example, in U.S. Pat. Nos. 5,196,353, 5,433, 651, 5,609,511, 5,643,046, 5,658,183, 5,730,642, 5,838,447, 5,872,633, 5,893,796, 5,949,927, and 5,964,643.

Figure 2:
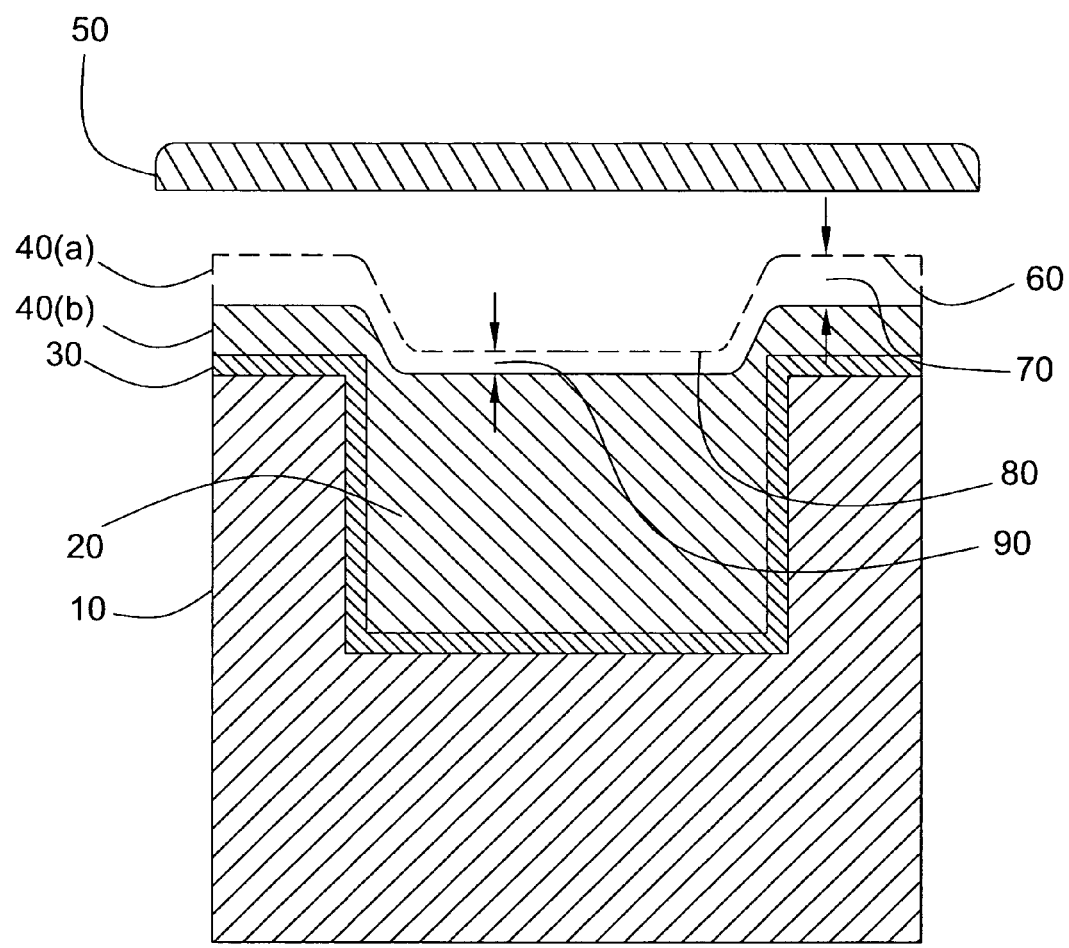
FIG. 2 is a cross-sectional view of a substrate being polished in accordance with the inventive method.

Advantageously, the inventive polishing composition provides for improved planarization efficiency in the polishing of a substrate. Referring to FIG. 2, a semiconductor wafer undergoing a chemical-mechanical polishing process is shown in cross section. A dielectric substrate (10) having a trench (20) formed thereon and overcoated with a barrier layer (30) and a metal layer (40) is contacted by polishing pad (50) in the presence of a polishing composition (not shown). After a period of time t, the height of the metal layer in the "high" areas (60) lying outside of the trench is reduced by a distance $D_H$ (70), and the height of the metal layer in the "low" areas (80) lying within the trench is reduced by a distance $D_L$ (90), thereby causing the removal of a portion of the metal layer ($40(a)$) and leaving the remainder of the metal layer ($40(b)$). The removal rate for the metal in the "high" areas, $RR_H$, is given by the equation $RR_H = D_H/t$ and the removal rate for the metal in the "low" areas, $RR_L$, is given by the equation $RR_L = D_L/t$. Planarization efficiency (PE) is given by the formula: $PE = 1 - (RR_L/RR_H)$. Desirably, the inventive method exhibits a planarization efficiency of about 0.5 or more (e.g., about 0.6 or more, or about 0.7 or more, or about 0.8 or more, or even about 0.9 or more), especially with respect to a metal, e.g., copper, tungsten, aluminum, alloys of aluminum such as aluminum-copper, and the like, a conducting gate material, e.g., polysilicon, or a dielectric material, e.g., silicon dioxide, low-κ dielectrics, carbon-doped oxides, glasses, and the like.

The invention further provides a method of preparing a chemical-mechanical polishing composition. The method involves (i) selecting a substrate to be polished with a chemical-mechanical polishing composition, wherein the substrate has at least one feature defined thereon, wherein the feature has at least one dimension with a size W, and wherein the at least one dimension is substantially coplanar with the substrate surface, (ii) providing an abrasive wherein the abrasive comprises particles having a mean particle diameter $D_M$ wherein the mean particle diameter of the particles satisfies the equation: $D_M \geq W$, and (iii) formulating the abrasive into a chemical-mechanical polishing composition. The other characteristics of the chemical-mechanical polishing composition utilized in this method embodiment of the invention (e.g., the nature and the amount of the abrasive particles, the morphology of the abrasive particles, and optional components of the polishing composition) are the same as set forth above for the chemical-mechanical polishing composition of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of chemically-mechanically polishing a substrate, which method comprises:
   (i) providing a substrate having at least one feature defined thereon, wherein the feature has at least one dimension with a size W and wherein the at least one dimension is substantially coplanar with the substrate surface,
   (ii) contacting the substrate with a polishing pad and a chemical-mechanical polishing composition comprising a liquid carrier and particles of an abrasive wherein the particles have a mean particle diameter $D_M$ wherein the mean particle diameter of the particles satisfies the equation: $D_M > W$, and wherein the abrasive particles are present as a colloidally stable suspension in the polishing composition,
   (iii) moving the polishing pad relative to the substrate with the chemical-mechanical polishing composition therebetween, and
   (iv) abrading at least a portion of the substrate to polish the substrate.

2. The method of claim 1, wherein less than about 1% of the particles have a particle diameter D wherein D<W.

3. The method of claim 1, wherein the mean particle diameter of the particles satisfies the equation: $D_M > 1.25W$.

4. The method of claim 3, wherein less than about 1% of the particles have a particle diameter D wherein D<W.

5. The method of claim 1, wherein the abrasive is selected from the group consisting of alumina, silica, ceria, germania, titania, zirconia, magnesia, silicon nitride, silicon carbide, organic polymers, and combinations thereof.

6. The method of claim 5, wherein the abrasive comprises substantially spherical particles.

7. The method of claim 5, wherein the particles have a plurality of facets, and wherein the facets have a minimum dimension $D_{min}$ wherein $D_{min} > W$.

8. The method of claim 1, wherein the polishing composition further comprises a film-forming agent.

9. The method of claim 7, wherein the film-forming agent is selected from the group consisting of benzotriazole, 1,2,4-triazole, and combinations thereof.

10. The method of claim 1, wherein the at least one feature is a trench, and the at least one dimension is the width of the trench.

11. The method of claim 1, wherein the at least one feature is a plug, and the at least one dimension is the diameter of the plug.

12. A method of preparing a chemical-mechanical polishing composition, which method comprises:
   (i) selecting a substrate to be polished with a chemical-mechanical polishing composition, wherein the substrate has at least one feature defined thereon, wherein the feature has at least one dimension with a size W, and wherein the at least one dimension is substantially coplanar with the substrate surface,
   (ii) providing an abrasive wherein the abrasive comprises a liquid carrier and particles having a mean particle diameter $D_M$ wherein the mean particle diameter of the particles satisfies the equation: $D_M > W$, and wherein the abrasive particles are present as a colloidally stable suspension in the polishing composition, and
   (iii) formulating the abrasive into a chemical-mechanical polishing composition.

13. The method of claim 12, wherein less than about 1% of the particles have a particle diameter D wherein D<W.

14. The method of claim 12, wherein the mean particle diameter of the particles satisfies the equation: $D_M > 1.25W$.

15. The method of claim 14, wherein less than about 1% of the particles have a particle diameter D wherein D<W.

16. The method of claim 12, wherein the abrasive is selected from the group consisting of alumina, silica, ceria, germania, titania, zirconia, magnesia, silicon nitride, silicon carbide, organic polymers, and combinations thereof.

17. The method of claim 16, wherein the abrasive comprises substantially spherical particles.

18. The method of claim 16, wherein the particles have a plurality of facets, and wherein the facets have a minimum dimension $D_{min}$ wherein $D_{min} > W$.

19. The method of claim 12, wherein the polishing composition further comprises a film-forming agent.

20. The method of claim 19, wherein the film-forming agent is selected from the group consisting of benzotriazole, 1,2,4-triazole, and combinations thereof.

21. The method of claim 12, wherein the at least one feature is a trench, and the at least one dimension is the width of the trench.

22. The method of claim 12, wherein the at least one feature is a plug, and the at least one dimension is the diameter of the plug.

* * * * *